United States Patent
Despesse

(10) Patent No.: US 10,199,675 B2
(45) Date of Patent: Feb. 5, 2019

(54) BATTERY MADE UP OF A CHAIN ASSEMBLY OF MODULES

(71) Applicant: COMMISSARIAT A L'ENERGIE ATOMIQUE ET AUX ENERGIES ALTERNATIVES, Paris (FR)

(72) Inventor: Ghislain Despesse, Saint Egrève (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 323 days.

(21) Appl. No.: 14/898,053

(22) PCT Filed: Jun. 13, 2014

(86) PCT No.: PCT/EP2014/062390
§ 371 (c)(1),
(2) Date: Dec. 11, 2015

(87) PCT Pub. No.: WO2014/198900
PCT Pub. Date: Dec. 18, 2014

(65) Prior Publication Data
US 2016/0126588 A1    May 5, 2016

(30) Foreign Application Priority Data
Jun. 13, 2013 (FR) ..................... 13 55500

(51) Int. Cl.
*H01M 10/04* (2006.01)
*H01M 2/02* (2006.01)
(Continued)

(52) U.S. Cl.
CPC ..... *H01M 10/0445* (2013.01); *H01M 2/0245* (2013.01); *H01M 2/202* (2013.01);
(Continued)

(58) Field of Classification Search
None
See application file for complete search history.

(56) References Cited

U.S. PATENT DOCUMENTS

2005/0280393 A1*  12/2005  Feldmann .................. B25F 5/00
                                                           320/114
2009/0071675 A1*  3/2009  Hanawa .............. H01M 2/1055
                                                           173/217
(Continued)

FOREIGN PATENT DOCUMENTS

WO    2007/100140 A1    9/2007
WO    2012/117113 A1    9/2012

OTHER PUBLICATIONS

Machine translation of WO 2012/117113 Sep. 2012 (Year: 2012).*
(Continued)

*Primary Examiner* — Wyatt P McConnell
(74) *Attorney, Agent, or Firm* — Westerman, Hattori, Daniels & Adrian, LLP

(57) ABSTRACT

Energy transmission device module (20) comprising at least one cell (21) connected to cell connectors (C), allowing this at least one cell (21) to be connected to components that are external to the module (20), characterized in that it comprises at least one independent electrical power link (29) of the at least one cell (21), which is connected to two connectors (Ai, Bi) of the module, allowing simple energy transport through the module (20).

20 Claims, 7 Drawing Sheets

(51) Int. Cl.
*H01M 2/20* (2006.01)
*H01M 10/42* (2006.01)
*H01M 2/10* (2006.01)

(52) U.S. Cl.
CPC ......... *H01M 2/206* (2013.01); *H01M 10/425* (2013.01); *H01M 2/1077* (2013.01); *H01M 2010/4271* (2013.01)

(56) References Cited

U.S. PATENT DOCUMENTS

2009/0258286 A1 10/2009 Ho
2011/0273132 A1 11/2011 Khaitan et al.
2013/0154549 A1 1/2013 Hanawa et al.

OTHER PUBLICATIONS

International Search Report and Written Opinion dated Jul. 28, 2014 issued in counterpart Application No. PCT/EP2014/062390; with English partial translation and partial machine translation (17 pages).

* cited by examiner

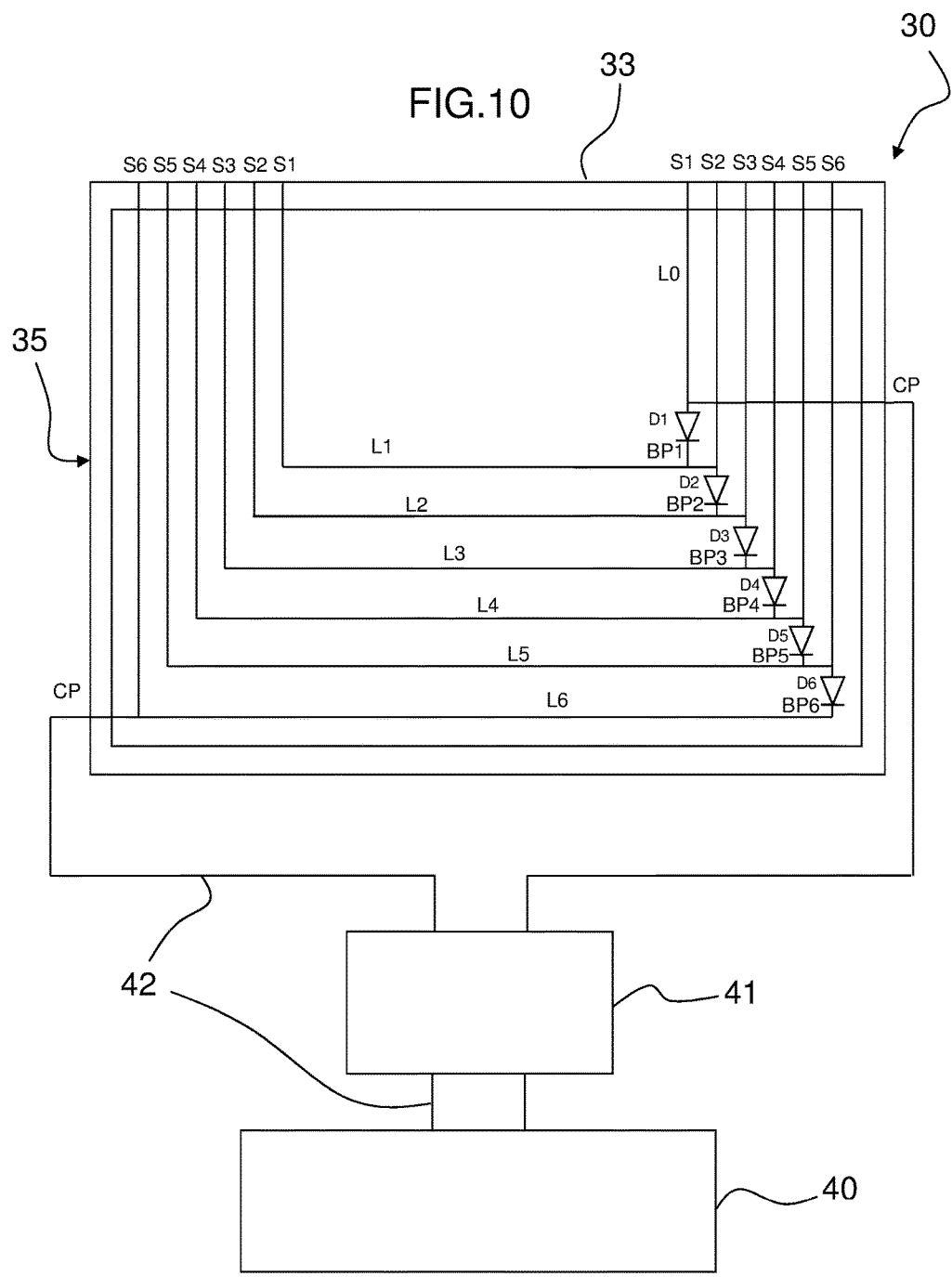

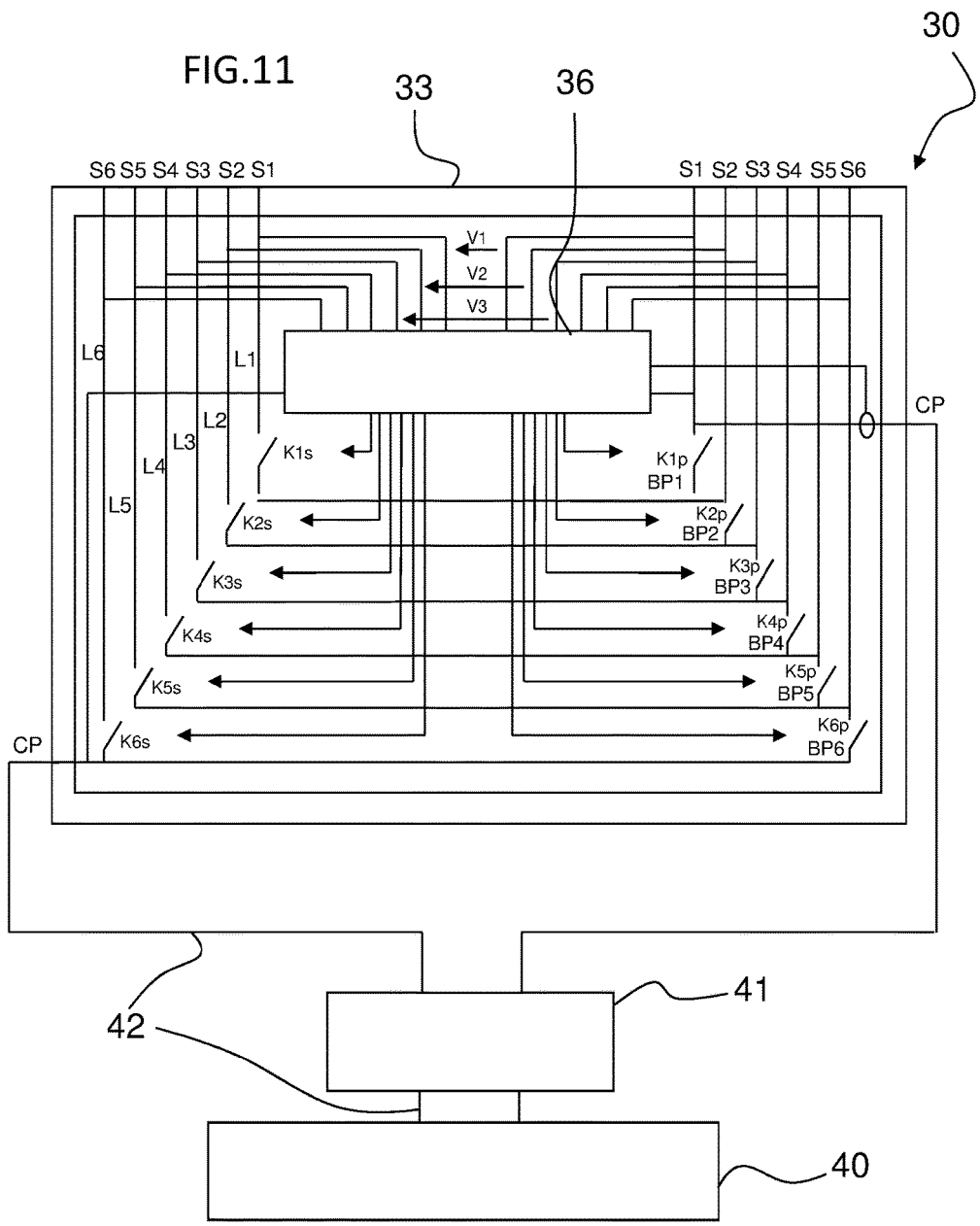

BATTERY MADE UP OF A CHAIN ASSEMBLY OF MODULES

The invention concerns an energy transmission device module, such as a battery module. It also concerns an energy transmission device and a battery as such comprising a plurality of modules. It also concerns a method for assembling such a battery or energy transmission device and a method for managing such a battery or energy transmission device.

Figure 1:
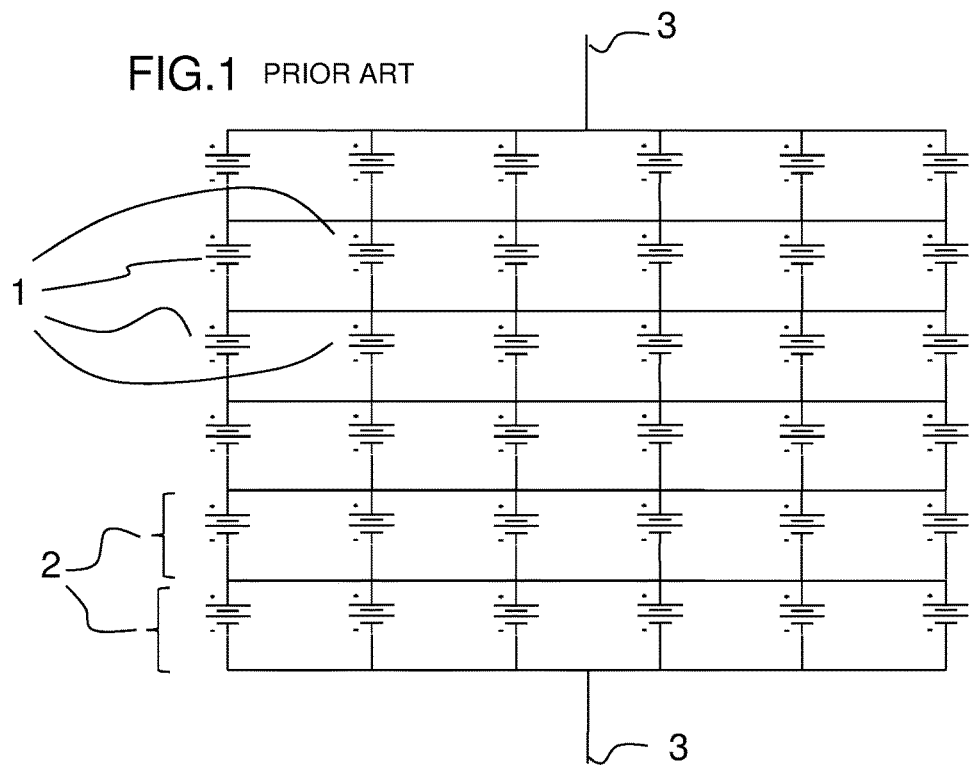

FIG. 1 shows a battery according to the prior art, also called a "battery pack". Such a battery pack, which we will simply call battery below, is made up of a multitude of elementary batteries. An elementary battery, often simply called a cell, comprises an active portion that plays a direct part in the function of storage and release of electrical energy, which may be of chemical nature, for example. This active portion is arranged in a housing, a first external face of which forms the positive terminal or first current collector of the cell and a second external face of which forms the negative terminal or second current collector. The battery, which is shown schematically in FIG. 1, comprises a conventional architecture having a plurality of stages or modules 2, arranged in series, and each module comprises a plurality of cells 1 arranged in parallel. The two modules arranged at the ends of the assembly each respectively form a terminal 3 for linking the battery to the outside, in order to supply power to an outer device, for example, or in order to recharge the battery.

According to a first implementation of the prior art, such a battery is implemented in practice by electrically connecting the various modules 2 by means of electrical wires and connectors, or by means of electrical cables soldered or screwed from module to module. Naturally, such an implementation is complex to produce, not very reliable, because multiplication of the intermediate electrical links increases the risk of failure, and is not very flexible, since the architecture of the battery is difficult to modify once it has been finalized.

According to a second, improved implementation of the prior art, the modules of the battery appear in the form of independent housings that are mechanically fixed and electrically connected to one another in a removable manner by means of a rack. In their position within the rack, the housings are connected to one another by a power bus arranged within the rack, and can transmit a voltage to output terminals, which are likewise arranged on the rack. Naturally, the rack is initially dimensioned according to the maximum number of modules that a use is likely to demand. Subsequently, even if the need is less, the rack therefore still keeps the same bulk. This solution thus keeps the disadvantage of requiring a rack of large and invariable bulk.

The previous observations also apply more generally to an electricity generating element, called an energy transmission device, for example made up of photovoltaic cells or fuel cells, that can have a modular architecture similar to that of the battery described previously and can encounter the same technical problems.

Thus, there is a need for an improved energy storage (or energy generation) solution allowing at least some of the disadvantages of the existing solutions to be resolved, and the aim of the invention is to achieve all or some of the objects that follow.

A first object of the invention is to propose an energy supply solution that allows reliable and extended operation to be guaranteed.

A second object of the invention is to propose an energy supply solution that is easily adapted to various demands of use, is flexible and user-friendly.

A third object of the invention is to propose an energy supply solution having minimum bulk.

To this end, the invention is based on an energy transmission device module comprising at least one cell connected to cell connectors, allowing this at least one cell to be connected to components that are external to the module, characterized in that it comprises at least one independent pair of electrical power links of the at least one cell, which is connected to two connectors of the module, allowing simple energy transport through the module. Each of these independent electrical power links is connected to two connectors of the module, of which one connector is arranged so as to be opposite a cell connector of another, identical module that would be assembled with this module, by making an electrical connection between these two connectors.

The invention also relates to an energy transmission device, notably a battery or an energy generating device, characterized in that it comprises at least two modules as described previously that are connected to one another in a chain, at least one first module being connected to a host support, which receives the power transmitted by all or some of the cells of the at least two modules, and comprises connectors for connecting the energy transmission device to an external device that is to be supplied with power.

Finally, the invention also relates to a method for assembling an energy transmission device, notably a battery, characterized in that it comprises a step of determination of the number of modules that are necessary according to a predetermined use, then connection of the necessary modules to one another in the form of a chain of modules, and connection of the first module to a host support.

The invention is defined more precisely by the claims.

These subjects, characteristics and advantages of the present invention will be set forth in detail in the following description of particular embodiments provided without limitation in conjunction with the attached figures, among which:

FIG. 1 schematically shows the structure of a battery according to a prior art.

Figure 2:
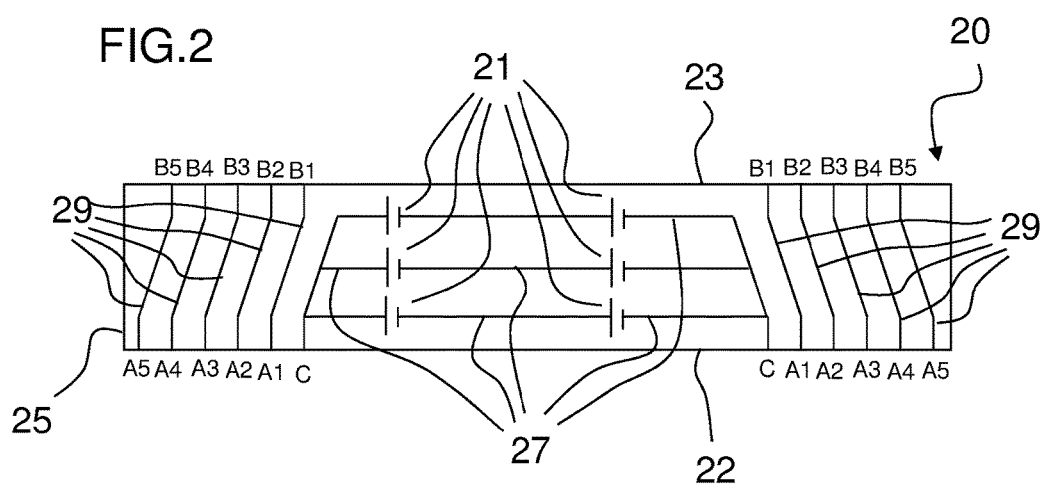

FIG. 2 schematically shows a battery module according to an embodiment of the invention.

Figure 3:
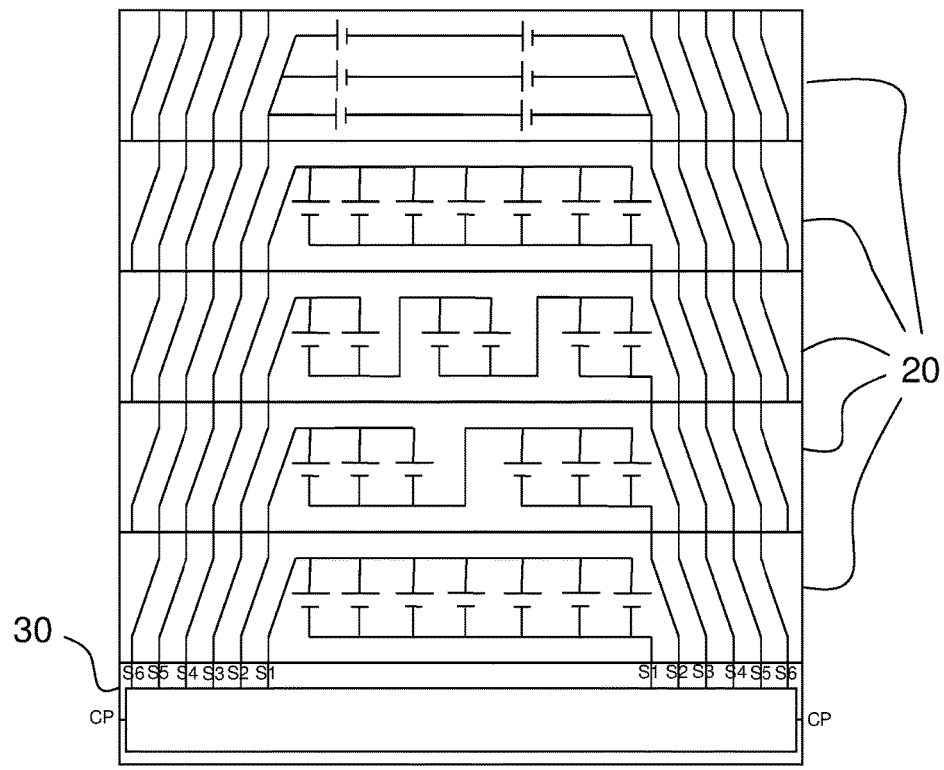

FIG. 3 schematically shows a battery according to a first embodiment of the invention.

Figure 4:
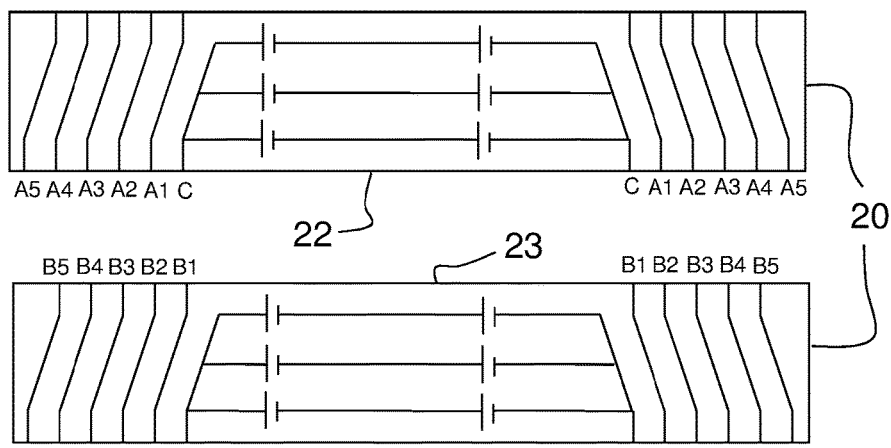

FIG. 4 schematically shows the assembly of two modules of a battery according to an embodiment of the invention.

Figure 5:
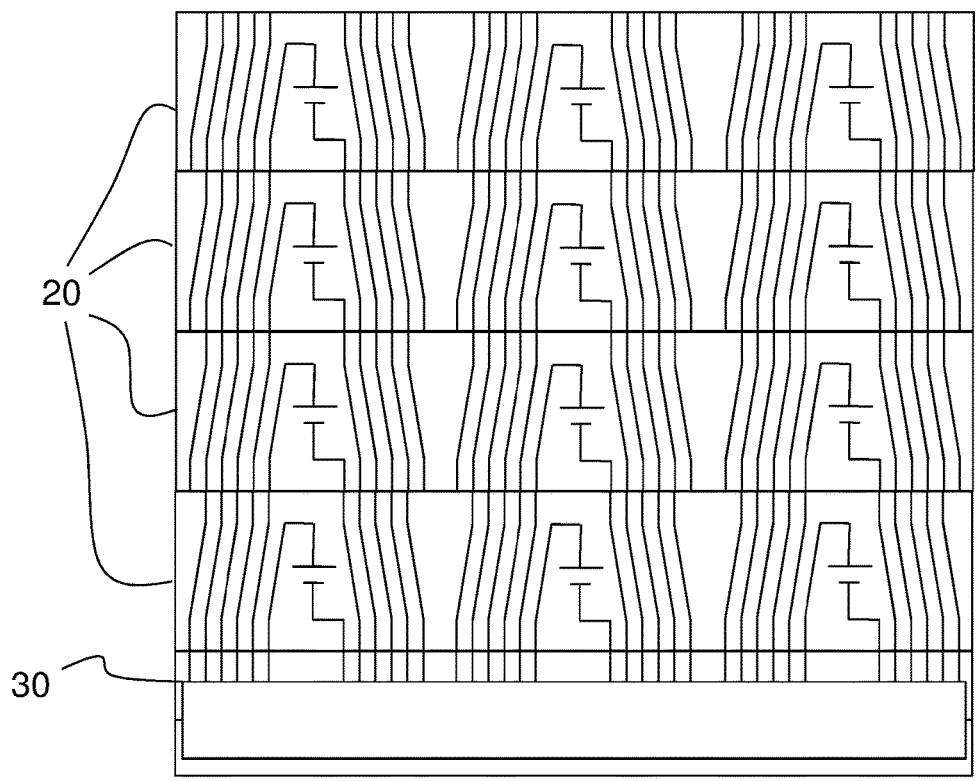

FIG. 5 schematically shows a battery according to a variant of the first embodiment of the invention.

Figure 6:
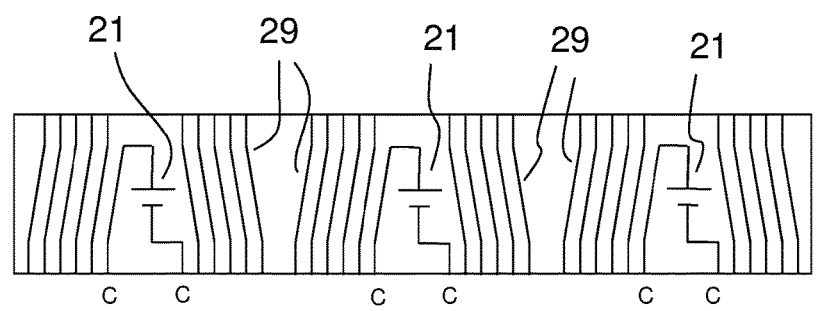

FIG. 6 schematically shows a battery module according to the variant of the first embodiment of the invention.

Figure 7:
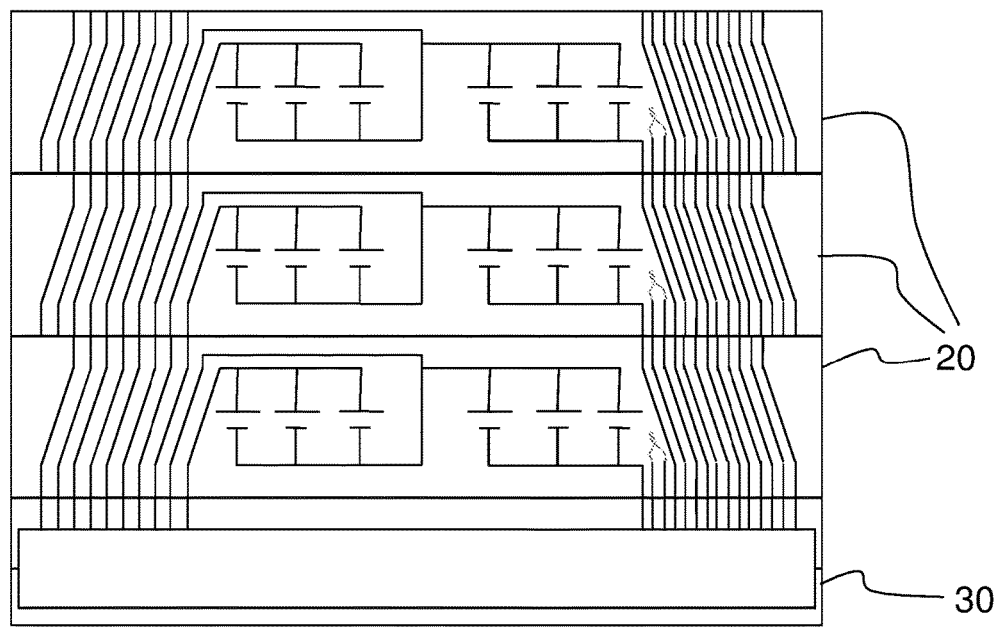

FIG. 7 schematically shows a battery according to a second embodiment of the invention.

Figure 8:
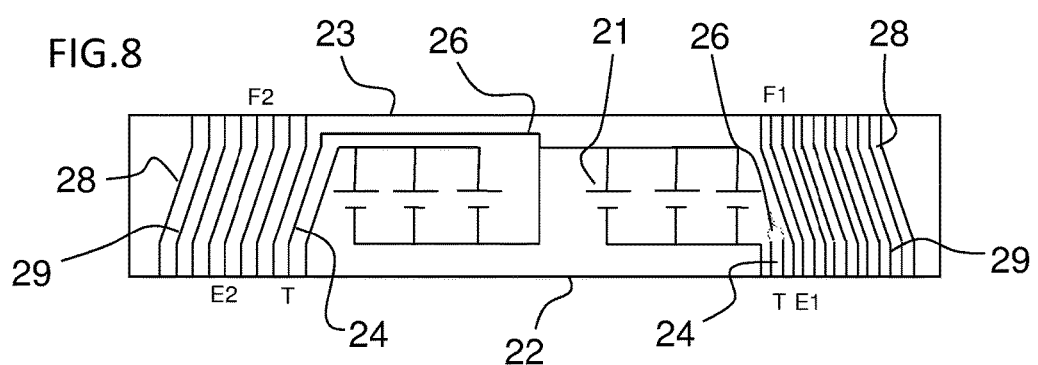

FIG. 8 schematically shows a battery module according to the second embodiment of the invention.

Figure 9:
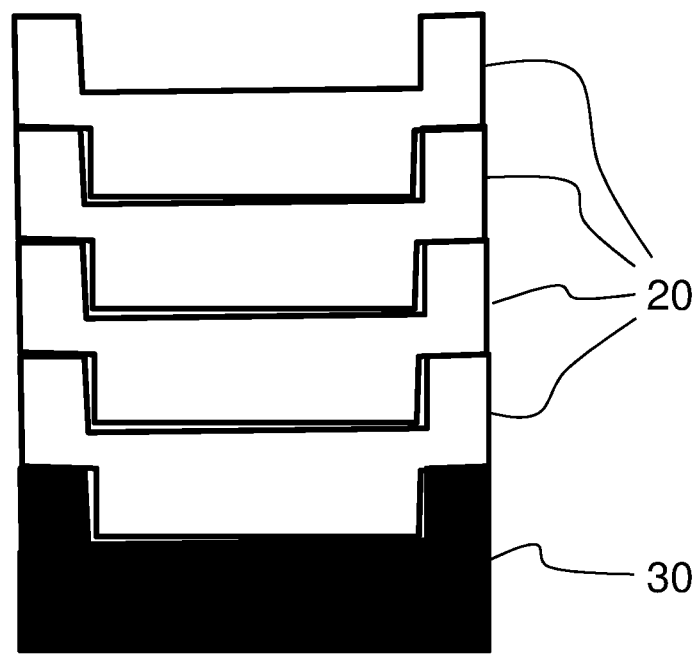

FIG. 9 schematically shows a battery comprising modules in different formats according to a variant of the embodiments of the invention.

FIG. 10 schematically shows a host support of a battery according to an embodiment of the invention.

FIG. 11 schematically shows a host support of a battery according to another embodiment of the invention.

In the figures that follow, the same references will be used for identical or similar elements in each embodiment of the invention, in order to simplify the description.

FIG. 2 schematically shows a battery module 20 according to an embodiment of the invention. This module 20 appears as a monolithic physical entity that is separable from the rest of the battery. In this embodiment, it has a parallelepipedal form. It comprises an outer casing 25 (or housing), comprising two surfaces 22, 23 that we will describe as lower surface 22 and upper surface 23 by convention in relation to the use by vertical assembly of such a module, as will become apparent subsequently. Connectors are provided, which are arranged on the outer casing 25 of the module, for assembly of the module 20 with other components in order to form a battery. Inside the casing 25, the module 20 comprises cells 21 that are connected to one another by electrical cell links 27, for example according to a series and/or parallel architecture. These cells 21 are connected to at least two cell connectors C, which are arranged on the lower surface 22 of the casing 25 in this embodiment and which have the function of allowing electrical linking of the cells 21 of the module 20 to the other components of the battery. It should be noted that the cell connector C on the right in the figure is connected to the low potential of the module 20 and that on the left in the figure is connected to the high potential, according to this embodiment. This assembly of the cells 21, of their electrical cell links 27 up to the cell connectors C, forms the active portion of the module 20.

Furthermore, the module 20 also comprises electrical links 29 that are totally independent of the active portion and have the function of electrically connecting the active portion of other modules of a battery, as will be explained below with reference to FIG. 3. The term "independent" therefore means that these electrical links 29 have no physical tie to the cells 21 and their electrical cell links 27 have no point at which the potential, which is not zero, would be dependent on at least one cell 21 of this module 20. Each electrical link 29 connects a first connector Ai arranged on the lower surface 22 of the module 22 to a connector Bi arranged on the upper surface 23 of the module 20. In this implementation, the module 29 comprises five pairs of electrical links 29 distributed laterally, on either side of the cells 21 and of their cell connectors C, and thus comprises five pairs of connectors A1, A2, A3, A4, A5, which are distributed symmetrically on either side of the two cell connectors C, on the lower surface 22 of the casing 25, and five pairs of connectors B1, B2, B3, B4, B5, arranged on the upper surface 23, that are connected to the five pairs of connectors A1, A2, A3, A4, A5, respectively, by independent electrical links 29.

FIG. 3 shows an embodiment of a battery 10, notably formed from a plurality of modules 20 similar to the one described previously, and using a host support 30 that will be set out in detail below. In this implementation, the battery comprises five modules 20 assembled vertically in a chain one on top of the other, above the host support 30. It should be noted that these various modules differ in terms of the organization of their cells 21. The reason is that they can comprise different active portions.

As becomes clearly apparent in FIGS. 3 and 4, the superposition of two modules 20 forms an electrical link between the connectors of the upper surface 23 of the first module, which is positioned beneath the second module with the connectors of the lower surface 22 of this second module. This link between two modules is shown more particularly in FIG. 4. The cell connectors C of the upper module connect to the first connectors B1 of the upper surface 23 of the lower module, and then the connectors Ai of the upper module connect to the connectors $Bi_{+1}$ of the lower module. In addition, the overall form of each module also promotes their physical, or even mechanical, linking, in addition to the aforementioned electrical connections. As an option, it is possible to envisage guide elements in order to facilitate the respective adjustment of the two modules and the correspondence of their connectors that are intended to cooperate.

In this way, it becomes apparent that the cells 21 of any given module 20 of the battery shown in FIG. 3 are finally electrically connected to the host support 30, by means of the cell connectors C of their module, and then by the independent electrical links 29 that pass through all the modules situated beneath this given module. The electrical links 27, 29, mentioned previously, of the modules 20 are therefore electrical links adapted for the transmission of power from or to the cells of the battery, and we will call them electrical power links. By way of example, they can be subjected to currents of several amps, or of several hundred amps. Their dimensions must notably be adapted to the flow of this current, namely have a section of flow of the current sufficient for there to be no significant heating due to the Joule effect. Moreover, independent electrical links 29 are advantageously sufficiently isolated from one another and in relation to the electrical links 27 to hold voltages of between a few tens of volts and several hundred volts.

In this embodiment, the independent electrical links 29 of a module are substantially parallel and inclined in order to finally allow their lower connector Ai to be superposed with an upper connector $Bi_{+1}$. They are also symmetrically distributed around a vertical mid-plane, in order to connect each of the two potentials from the two cell connectors C of each module in a similar manner. With an implementation of modules comprising five independent electrical links 29, it becomes apparent that is possible to build a battery having no more than six superposed modules 20. Naturally, the same principle can be implemented for any other number of independent electrical links 29 and associated connectors Ai, Bi.

The host support 30 of the battery, which supports any vertical stack of the modules in this embodiment, also appears in the form of an independent physical entity, also in parallelepipedal form in this embodiment. It comprises pairs of power connectors Si on its upper surface 33, shown particularly by FIGS. 10 and 11, which are connected to the connectors C and Ai arranged on the lower surface 22 of the first module 20 of the battery. This architecture means that the host support 30 of the battery is thus electrically connected, directly or indirectly, by its pairs of power connectors Si, to all the active portions of all the modules of the battery. The host support 30 then organizes the electrical linking of the various modules to one another and the electrical linking of the battery to the outside, by means of connectors CP, as will be outlined in detail below.

This principle can be implemented with modules 20 having a different internal architecture, and also a different organization for their connectors. FIG. 5 thus shows a variant implementation in which each module 20, shown specifically by FIG. 6, has independent cells 21, which are connected separately to a plurality of separate couples of cell connectors Ci. As a variant, each cell 21 shown in FIGS. 5 and 6 could be replaced by any arrangement of a plurality of cells 21. With this new architecture for the cells 21 within the modules, the independent electrical links 29 are also rearranged, distributed around the cells 21, and associated with a multitude of pairs of connectors Ai, Bi, as are shown. The principle remains identical, the electrical links 29 of each module of the battery are connected to one another so that the various cells 21 of each module are electrically linked to the host support 30. In this implementation, each module 20 comprises three cells 21. In one embodiment, these cells can be placed in series: however, this series linking passes through the host support 30, which thus has access to the intermediate potentials between these cells and can implement smart management functions, such as balancing these cells. In another development, the three cells 21 are used independently of one another in order to generate three separate voltages on the host support (for example in order to generate three phases to form a three-phase system).

FIGS. 7 and 8 show a second embodiment of the invention, in which a module 20 integrates at least one sensor and communication links, in addition to the electrical power links 27, 29 mentioned in the preceding embodiment, for the transmission of information from or to this at least one sensor. In the example shown in FIG. 8, each module integrates a temperature sensor 26 and a voltage measurement sensor 26 that are connected by a pair of first communication links 24 up to supplementary sensor connectors T arranged on the lower surface 22 of a module. Second communication links 28, which are independent of these first communication links 24, pass through each module 20 between communication connectors Ei and Fi arranged on the lower surface 22 and the upper surface, respectively, of each module 20, which are not all shown so as not to weigh down the figure. As becomes apparent in FIGS. 7 and 8, these second communication links 28 are inserted between the second electrical links 29 on a lateral portion. Naturally, other sensors and associated communication links could be added as a variant, such as sensors for measuring voltage, current, etc. Finally, this module also comprises all the elements already explained in the preceding embodiment.

FIG. 7 shows the battery obtained by assembling three modules 20 as described above on a host support 30. As becomes apparent, two juxtaposed modules implement an electrical connection both for the electrical power links, as mentioned previously, but also for their communication connectors, the communication connectors Ei arranged on the lower surface of one module linking to the communication connectors $Fi_{+1}$ arranged on their upper surface, and the sensor connectors T cooperating with the first communication connector F1. In this implementation, it becomes apparent that, in a manner similar to the electrical power links, all the sensors of all the modules are linked by communication links to the host support 30, which is also arranged to have the supplementary connections cooperating with all the connectors on the lower face of the first module of the battery.

Thus, the architecture of a battery of this kind duly achieves the intended objects and attains the following advantages:
- it is possible to build a flexible modular structure, by forming an assembly of simple modules, without resorting to a rack;
- a user can make do with the number of modules that is sufficient for a particular use;
- the bulk obtained is therefore limited to the modules that are actually necessary;
- if a user erroneously assembles more modules than it is possible for the host support to manage, then the last modules will simply not be used, and this will not give rise to any risk or danger;
- it is possible to easily replace a defective module, without challenging the rest of the components of the battery;
- in the implementations described, all the modules can be assembled in any order, by means of their simple superposition.

All the preceding modules can be subjected to numerous modifications and variants without departing from the concept of the invention. Notably, the various connectors can take various forms and be arranged at various locations on the casing 25 of a module, which are not necessarily limited to the upper and lower surfaces. Moreover, these modules can also appear in any other format, so long as it allows them to be fitted together as described previously. To this end, FIG. 9 schematically shows a variant implementation based on a different form of the modules. As a variant, the modules could be assembled in a lateral direction, in addition to or as a replacement for the vertical stacks shown. Furthermore, the active portion of the modules can be arbitrary and comprise any electrical organization and any number of cells. The term module must be understood in the broad sense and can correspond to any battery subassembly. As a variant, it is also possible to imagine assemblies of modules that are not necessarily all identical but that may also have different formats and/or different internal structures, so long as their format remains compatible and allows them to be assembled mechanically and electrically.

FIG. 10 provides a more detailed illustration of the architecture of a host support 30, associated with the first embodiment of the battery, with reference to FIGS. 2 and 3. However, the same principles can be implemented on any host support 30 that is adapted to the other embodiments described previously. This host support 30 also appears in the form of a parallelepipedal housing 35, comprising connectors CP for connecting the battery to an external device, which are arranged on two opposite lateral surfaces of the housing in the example shown. In this illustrated example, the battery thus supplies power to a device 40 by means of a DC/DC or possibly DC/AC converter 41 through electrical links 42. Then, the host support 30 comprises pairs of power connectors Si on its upper face 33, which are intended to cooperate with the corresponding connectors arranged on the lower surface 22 of the module 20 that is directly superposed on the host support, which is not shown in order to simplify the representation. The host support 30 can take all forms, so long as its format on its upper portion remains compatible and allows the mechanical and electrical assembly of the first module 20. The other faces of the host support 30 can notably be adapted to be mechanically fixed on the device that requires electrification: for example on the frame of a scooter, on the luggage rack of a bicycle, inside a car boot, in the hold of a boat, etc.

The host support 30 moreover comprises electrical power links $L_i$, connecting the left power connector Si to a right power connector $Si_{+1}$. The last left connector, S6 in this example, which is intended to be electrically linked to the high potential of the highest module 20 of the battery, is directly connected to one of the connectors CP, and the first right connector, S1 in this example, which is intended to be electrically linked to the low potential of the lowest module 20 of the battery, is directly connected to the other connector CP. These electrical links thus allow series connection of the various active portions of the various modules of the battery between the two connectors CP, in order to form an electrical architecture that is finally similar to that in FIG. 1.

It should be noted that the host support 30 also manages the possible absence of one or more module(s) 20, since their number can vary. For that purpose, bypass links BPi are arranged between electrical links $L_{i-1}$ and Li mentioned previously, on which diodes Di are arranged. In order to illustrate the operation of this electrical architecture, let us revisit the battery illustrated by FIG. 3 by way of example. As it comprises only five modules, the pair of connectors S6 of the host support is not connected to any potential. In this situation, the current from the high potential of the fifth module, which enters the host support by the left connector S5 and is then conducted by the electrical link L5, cannot pass through the sixth module by returning by the right connector S6, since the latter is not connected to a sixth module, which does not exist: in this case, the current will pass through the bypass BP6 via the diode D6, so as then to reach the left connector CP by taking a portion of the electrical link L6. As the potential between the connectors S6 is zero, the bypass BP6 is automatically created. Naturally, operation would be the same if there were only four modules, by virtue of a bypass via the link BP5, then BP6, and so on.

FIG. 11 illustrates a host support 30 according to another embodiment of the invention, which can likewise be used in the battery shown by FIG. 3. In this implementation, the bypass links managing the absence of a module are notably modified, formed by means of bypass switches Kip arranged on the bypass links BPi as a replacement for the diodes Di of the preceding embodiment, which have the disadvantage of giving rise to a significant voltage drop when they carry a current. As a variant, any other device for activating or not activating (closing/opening) the bypass links can be used. These switches Kip are controlled by a control unit 36 that is internal to the host support 30. The latter moreover comprises a device for measuring the voltage Vi between the power connectors Si of all the pairs of connectors. The control unit 36 thus detects a positive, zero or negative voltage Vi on the terminals of a pair of power connectors Si by virtue of this voltage measuring device, which allows it to automatically detect the absence of a module 20 whose cells would be likely to be connected to the pair of connectors in question. Following this detection, the control unit 36 commands the closure of a switch Ki+1p, in order to form the bypass link, according to the same principle as that outlined in detail previously.

It should be noted that, if a module is absent, the voltage measured on the power connector Si that is not connected to an active module portion is potentially floating, and could accidentally correspond to the voltage of a module and prompt a diagnostic error. To avoid such a situation, one solution consists in placing a pull-down resistor at a known potential, for example the potential of the earth of the circuit, at the moment of the measurement. As a variant, another solution for detecting the absence of a module consists in measuring its electrical impedance.

It should be noted that the host support 30 according to this embodiment comprises a second switch Kis arranged on each electrical link Li, likewise controlled by the control unit 36. In a configuration in which a bypass switch Kip is open and the second switch Kis is closed, the various superposed modules 20 are linked in series, as explained previously, by means of the links Li of the host support. However, this association of the two types of switches Kis, Kip affords the advantage of allowing various other combinations to be implemented. Notably, if a second switch Kis is open and a switch Kip is closed, then the module no i of the stack, whose connectors C of the active portion are connected to the power connectors Si of the host support, is isolated from the stack and replaced by a short circuit on the power path.

This architecture that is more developed than that of the preceding embodiment allows a method for advantageously managing a battery of this kind to be implemented, which can be controlled by the control unit 36, which is furnished with hardware means, such as at least one computer and a memory, and software means.

This management method notably implements a step of balancing of the voltage of the various modules. For that purpose, the modules that have the most charge, which are detected by virtue of the voltage received and measured by the control unit 36, are used as a matter of priority. The reason is that the mechanism of placing or not placing the module in series with the rest of the battery, by means of the set of switches explained previously, allows each module finally to be or not to be used at a given instant. It is thus possible to separate a module that is more discharged than the others for the time that is necessary in order to obtain rebalancing of the voltages of the modules. The modifications of the use or non-use of the various modules can be made periodically, according to a duty cycle that is computed for each module so as to obtain balancing of the modules of the battery. Similarly, the charge of the battery implements a more extensive charging step for the modules that have the least charge, by placing them in series during this charging phase as a priority and/or for an overall period that is longer than for other modules having more charge.

The management method also implements a step of real-time or quasi-real-time adaptation of the output voltage of the battery according to the need of the device 40 that is to be supplied with power. For that purpose, the control unit 36 disconnects or does not disconnect some of the modules from their series link to the other modules.

This architecture also allows overheating or defective cells to be separated.

Naturally, the host support 30 thus described can have other forms and inner architectures. It is adapted to the connections and to the structure of the modules. By way of example, it can manage a three-phase output using a structure as presented by FIGS. 5 and 6, as has been mentioned previously. It can also comprise communication connections, in order to adapt to a modular architecture and to a battery as are presented by FIGS. 7 and 8. These communication links can be connected to an internal control unit, allowing it to receive sensor measurements, for example for temperature, voltage and/or current, from all or some of the modules, in order to set up diagnostics for the various modules in question and to use these data in the management of their use and/or their charge.

The invention also relates to a method for assembling (design, manufacture) a battery, comprising a step of determination of the number of modules that are necessary according to a predetermined use, then connection of the necessary modules to one another in the form of a chain of modules, and connection of the first module in the chain of modules to a host support. Among the advantageous uses of such a battery, it is possible to cite the supply of power to a transport vehicle, such as a car, a bus, a boat, a motorcycle, etc., or the implementation for supplying power to a piece of portable electric hardware, a base station for telephony, an emergency generator, etc.

It should be noted that all or some of the cells of a battery as described previously can be associated with a local energy source, for example of solar sensor, thermal sensor, mechanical/electrical converter, etc., type, in order to take advantage of this source for recharging them, for example, and/or in order to provide additional options for the supply of energy by the battery. According to another variant, all the preceding architectures have been described within the context of a battery, but could also apply to an energy generating device, said cells no longer being energy storage cells but rather energy generation cells, for example of photovoltaic type, which are possibly associated with energy storage components. In order to include these variant implementations, the more general term energy transmission device is used.

The invention claimed is:

1. Energy transmission device module comprising:
   at least one cell connected to cell connectors, the cell connectors being configured to allow the at least one cell to be connected to components that are external to the module,
   at least one pair of independent electrical power links of the at least one cell that are provided for energy transport through the module, each of the electrical power links being connected to first and second module connectors,
   wherein the first module connector of each of the electrical power links is arranged opposite a respective one of the cell connectors of the at least one cell, so that the first module connectors of the module are configured to make electrical connection with cell connectors of another module identical to the module.

2. The energy transmission device module according to claim 1, comprising at least one other pair of independent electrical links of the at least one cell, which are respectively connected to at least one other pair of first module connectors and to at least one other pair of second module connectors, wherein the other pair of second module connectors is configured to snake electrical connection with a pair of first module connectors of another module identical to the module.

3. The energy transmission device module according to claim 1, wherein the module is in a monolithic format with a casing within which the cell connectors connected to the at least one cell and the module connectors connected to the independent links are arranged.

4. The energy transmission device module according to claim 3, wherein the module has a parallelepipedal form, wherein the cell connectors are arranged on one of an upper surface and a lower surface of the module and the first module connectors are arranged on the other of the upper surface and the lower surface of the module, so that the module is configured for vertical stacking of the module with another module.

5. The energy transmission device module according to claim 1, comprising at least one independent communication link, connected to two communication connectors, allowing transport of a piece of communication information through the module.

6. The energy transmission device module according to claim 5, comprising at least one measurement sensor linked to at least one of the communication connectors.

7. The energy transmission device module according to claim 1, comprising at least one other cell connected to other cell connectors, wherein the cells are connected to the respective cell connectors by first electrical links, and wherein the independent electrical power links are symmetrically distributed around the cells.

8. Energy transmission device, comprising:
   at least two modules according to claim 1 that are connected to one another in a chain, and
   a host support, at least one first module among the at least two modules being connected to the host support, wherein the host support receives power transmitted by all or some of the cells of the at least two modules, and comprises connectors configured for connecting the energy transmission device to an external device that is to be supplied with power.

9. The energy transmission device according to claim 8, wherein the host support comprises power connectors connected to the cell connectors and the module connectors of the first module, so that the host support receives power from the cells of the first module through a first pair of the power connectors, and power from the cells of at least one other of the modules through another pair of the power connectors, the power from the cells of the at least one other of the modules transiting through the first module by the independent electrical power links of the first module.

10. The energy transmission device according to claim 8, wherein the first module is connected to power connectors of the host support, wherein the host support comprises electrical links between the power connectors of the host support, allowing at least one of electrical series connection and parallel connection of all or some of the at least two modules of the energy transmission device.

11. The energy transmission device according to claim 8, wherein the host support comprises electrical bypass links configured to allow the energy transmission device to operate without the cells of at least one of the modules connected to the host support.

12. The energy transmission device according to claim 8, wherein the host support comprises a control unit that cooperates with at least one of the following components:
   a device for detecting presence, failure or overheating in any of the modules, in order to control the opening or non-opening of at least one switch allowing formation or non-formation of a bypass link within the host support;
   at least one switch arranged on electrical links between power connectors of the host support, in order to be able to disconnect or not disconnect a module from the rest of the energy transmission device;
   at least one communication link that receives measurement data from a sensor arranged within one of the modules.

13. Method for assembling an energy transmission device, comprising:
   determining a number of modules that are necessary according to a predetermined use, then
   connecting the necessary modules to one another in the form of a chain of modules, wherein the connected modules include at least one module according to claim 1, and
   connecting a first module among the connected modules to a host support.

14. The energy transmission device according to claim 11, wherein the electrical bypass links are equipped with an activation device.

15. The energy transmission device according to claim 14, wherein the activation device is a diode or a switch.

16. The energy transmission device according to claim 12, wherein the control unit cooperates with at least one switch arranged on electrical links between power connectors of the host support, in order to be able to disconnect or not disconnect a one of the modules from the rest of the energy transmission device, so as to meet the need for a supply of electric power to a device connected to the energy transmission device.

17. The energy transmission device according to claim 12, wherein the control unit cooperates with at least one switch arranged on electrical links between power connectors of the host support, in order to be able to disconnect or not disconnect a module from the rest of the energy transmission device, so as to balance power among the modules, the energy transmission device having a storage element.

18. The energy transmission device module according to claim 2, wherein the module is in a monolithic format with a casing within which the cell connectors connected to the at least one cell and the module connectors connected to the independent power links are arranged.

19. The energy transmission device module according to claim 18, wherein the module has a parallelepipedal form, wherein the cell connectors are arranged on one of an upper surface and a lower surface of the module and the first module connectors are arranged on the other of the upper surface and the lower surface of the module, so that the module is configured for vertical stacking of the module with another module.

20. The energy transmission device module according to claim 2, comprising at least one independent communication link, connected to two communication connectors, allowing transport of a piece of communication information through the module.

\* \* \* \* \*